United States Patent [19]
Hartmann

[11] 3,741,986
[45] June 26, 1973

[54] PROCESS FOR PREPARING CYCLIC KETALS

[75] Inventor: Ludwig A. Hartmann, Wilmington, Del.

[73] Assignee: ICI America Inc., Wilmington, Del.

[22] Filed: Nov. 3, 1969

[21] Appl. No.: 873,660

[52] U.S. Cl............ 260/340.9, 260/338, 260/340.2, 260/340.7, 260/614 F
[51] Int. Cl............................................. C07d 13/04
[58] Field of Search...................... 260/340.7, 340.9

[56] References Cited
OTHER PUBLICATIONS

Boekelheide, et al., "Journ. Amer. Chem. Soc.," Vol. 71 (1949) pp. 3303–7.

Primary Examiner—Tex Mazel
Assistant Examiner—James H. Turnipseed
Attorney—Kenneth E. Mulford and Roger R. Horton

[57] ABSTRACT

Cyclic ketals based upon polyhydric alcohols containing at least three hydroxyl groups and at least three carbon atoms and ketones of the general formula

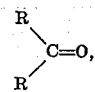

wherein each R is a halogenated alkyl radical and wherein the carbon atom adjacent to the carbonyl carbon of said ketone is completely halogenated, and processes for producing these cyclic ketals are described.

6 Claims, No Drawings

PROCESS FOR PREPARING CYCLIC KETALS

This invention relates to novel cyclic ketals and to methods for producing same. More particularly, this invention relates to cyclic ketals of polyhydric alcohols and halogenated ketones.

It is an object of this invention to provide novel cyclic ketals.

It is also an object of this invention to provide a method for making cyclic halogenated ketals.

These objects and still further objects will become evident to those skilled in the art from the following detailed description of this invention.

The cyclic ketals of polyhydric alcohols which contain at least three hydroxyl groups and at least three carbon atoms, and ketones of the general formula

(1)

wherein each R is a halogenated alkyl radical containing at most three unhalogenated carbon atoms and the carbon atom of said alkyl radicals attached to the carbonyl carbon of said ketone has at least two halogen atoms attached thereto, are the subject of this invention.

Polyhydric alcohols within the above class include simple sugars and polyols. Examples of polyols are alkanetriols, alkanetetrols, alkanepentols and alkanehexols. More specifically, compounds such as sucrose, sorbitol, mannitol, erythritol, xylitol, 1,4-sorbitan, glycerol, 1,2,3-butanetriol, 1,2,3,4-hexane-tetrol xylose, 1,2,3-heptanetriol, glucose and 1,2,4-butanetriol are considered within the class of polyhydric alcohols which contain at least three hydroxyl groups and at least three carbon atoms. A preferred group of polyhydric alcohols include glycerol, sorbitol, threitol, erythritol, butanetriols and xylitol.

Ketones within formula (1) may, for example, include perhalogenated alkyl radicals of the general formula $C_nX_{2n+1}$ where $n$ is an integer from 1 to 10 and X is a halogen with an atomic weight of at most 36. The halogen content of said ketones can be a mixture of halogens.

Examples of these ketones are bis(trifluoromethyl) ketone; bis(chlorodifluoromethyl) ketone; chlorodifluoromethyl, fluorodichloromethyl ketone; α, α-difluoroethyl pentafluoroethyl ketone; dichlorofluoromethyl-α, α-difluoro-β,β-dichloropropyl ketone; bis(pentafluoroethyl) ketone; bis(trifluorodichloroethyl) ketone; α,α-β,β-γ,γ-hexafluoroheptyl-α,α-difluoroethyl ketone and α,α-difluoroethyl nonafluorobutyl ketone. A preferred group of ketones includes perhalogenated alkyl radicals of the general formula $C_nX_{2n+1}$, where $n$ is an integer from 1 to 7 and X is a halogen with an atomic weight of at most 36.

A preferred class of cyclic ketals of this invention are based upon polyhydric alcohols having from three to six carbon atoms and from three to six hydroxyl groups, and ketones containing from three to about nine carbon atoms, the halogen having an atomic weight of at most 36 and the halogen content of any ketone can be a mixture of halogens. The preferred subclass of cyclic ketals are those formed from glycerol carbonate or butanetriol carbonates and perhalogenated acetone selected from the group consisting of hexafluoroacetone, chloropentafluoroacetone, dichlorotetrafluoroacetones, and trichlorotrifluoroacetones.

A class of cyclic ketals of this invention may be represented by the formula

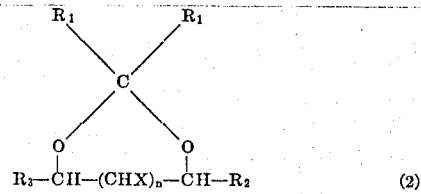

(2)

where X is either a hydrogen atom or a hydroxyl group, $n$ is an integer from 0 to 1, each $R_1$ is a perhaloalkyl radical; $R_2$ and $R_3$ are independently selected from hydrogen, an alkyl radical, a hydroxy or polyhydroxy alkyl radical, or a radical within the formulae

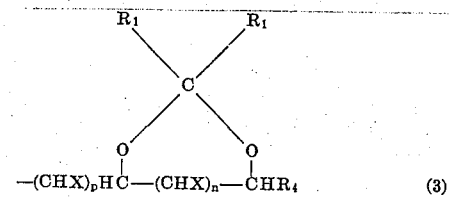

(3)

In formula (3), $R_1$, X, and $n$ are as defined above for formula (2). $p$ is a number from 0 to 2, when p is 0, $R_4$ is either hydrogen, alkyl, hydroxyalkyl or polyhydroxyalkyl, and when $p$ is greater than 0, $R_4$ is hydrogen. In formula (2), X, $R_3$, and $R_2$ are chosen so that there is at least one free hydroxyl group.

In a subclass of the cyclic ketal of formula (2), each $R_1$ would be independently selected from perhaloalkyl radicals of from 1 to 7 carbon atoms and contain halogen atoms whose atomic weight at most about 36. The $R_2$ and $R_3$ radicals of this class would be an alkyl radical, a hydroxy or polyhydroxy alkyl radical, or a hydrogen atom.

In a preferred class of cyclic ketals within formula (2) the hetero ring contains at most 5 members, and the perhalogenated alkyl radicals, which comprise $R_i$, contain halogen atoms with an atomic weight up to about 36.

Examples of the cyclic ketals within this invention include among others: 2,2-bis(trifluoromethyl)-4-hydroxymethyl-1,3-dioxolane; 2,2-bis(fluorodichloromethyl)-5-hydroxy-1,3-dioxane; 2,2-bis(trichloromethyl)-4-dihydroxyethyl-1,3-dioxolane; 2-dichlorotrifluoroethyl-2-tetrachlorotrifluoropropyl-4-hydroxymethyl-1,3-dioxolane; 1,2:4,5-di-0-hexafluoroisopropylidene sorbitol; 2-trichlorodifluoroethyl-2-pentachlorotetrafluorobutyl -4-hydroxymethyl-1,3-dioxolane; 2-heptafluoropropyl-2-pentafluoroethyl-4-hydroxymethyl-5-α,β-dihydroxyethyl-1,3-dioxolane; 2,2-bis(dichlorofluoromethyl)-5-hydroxy-1,3-dioxane; 2,2-bis(trifluoromethyl)-4-(2-hydroxyethyl)-1,3-dioxolane; 2,2-bis(trifluoromethyl)-4-hydroxymethyl-1,3-dioxane; and 2,2-bis(chlorodifluoromethyl)-4-hydroxymethyl-1,3-dioxane.

To further illustrate the cyclic ketals within this invention the following formulae are given:

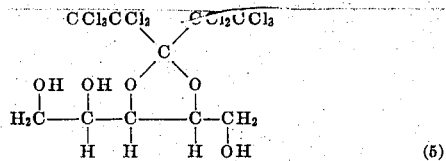

(5)

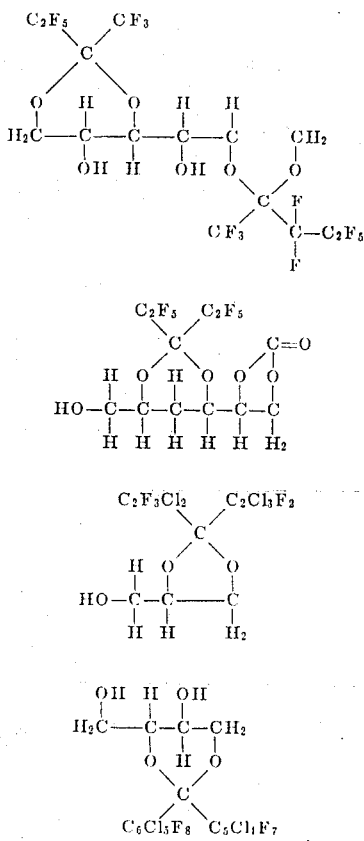

In the practice of this invention the cyclic ketals described above may be prepared by heating a ketone, within formula (1) above, with a cyclic carbonate of a polyhydric alcohol, which polyhydric alcohol contains at least three hydroxyl groups and three carbon atoms, and which cyclic carbonate contains one or more cyclic carbonate groups. When said cyclic carbonate contains no free hydroxyl groups the reaction is carried out in the presence of a lower alcohol or water. The mol ratio of ketone to cyclic carbonate may be as high as about 10 mols of ketone per cyclic carbonate group. Where a lower alcohol is used a sufficient quantity for dissolving the cyclic carbonate is employed. Alternately, the cyclic ketals may be prepared by reacting a lower alcohol or water with a ketone within formula (1) above, forming a hemiketal or a hydrate respectively, and subsequently reacting this product with a cyclic carbonate described above. Where a cyclic carbonate containing more than one carbonate group is reacted products may be formed containing both carbonate and ketal rings.

More particularly, a hydroxyl bearing cyclic carbonate of a polyhydric alcohol may be reacted with a ketone within formula (1) above in a two step reaction to form the cyclic ketal. The first step of the reaction forms an intermediate product which is a hemiketal of the ketone. This reaction may be initiated at temperatures as low as about 10° C. or as high as about 120°C. As the temperature falls below 10°C. initiation and reaction will become more difficult, as the temperature exceeds 120°C. the reaction proceeds progressively poorer and loss of the intermediate product results. The final reaction step is mostly an intramolecular reaction where the hemiketal function attached to said cyclic carbon reacts with a carbonate group to form the cyclic ketal. This step, depending upon the reactants, will usually take at least one hour. The temperatures for this step are generally from 100°C. to about 170°C. As the temperature falls below 100°C. the reaction becomes sluggish; as the temperature rises above 170°C. loss of yield and reactants will start to occur.

An alternate process which yields equally good product and does not require the cyclic carbonate to also contain a free hydroxyl group, starts by reacting a ketone within formula (1) with a lower alcohol to form a hemiketal or with water to form a hydrated ketone. This reaction occurs at temperatures from about 10° to about 120°C. Then the product, namely the hydrate or hemiketal is reacted with a cyclic carbonate at from about 100°C. to about 170°C. to form the cyclic ketal; as in the above process the temperature ranges are chosen to optimize the reaction. Naturally if a suitable hemiketal or hydrate is available the formation step can be omitted and it can be directly reacted with the carbonate.

In a preferred method of preparing these ketals the mols of ketone per cyclic carbonate group are from about 0.3 to about 3, the cyclic carbonate used contains up to about 3 cyclic carbonate groups and at least one free hydroxyl group. The temperature is maintained at 25°–70°C. for from 0.5 to 30 hours and then raised to 120°–160°C. until carbon dioxide is no longer being evolved.

Among the lower alcohols which may be used are saturated aliphatic mono alcohols, saturated aliphatic diols, and saturated aliphatic triols, wherein the aliphatic chian contains up to 4 carbon atoms. Examples are: ethanol, 1,2-butanediol, methanol, 1,2,3-butanetriol.

Examples of carbonates which can be used are: tetritol mono and biscyclic carbonates, glycerol cyclic carbonate, hexitol mono, bis and triscyclic carbonates, hexanetetrol mono and biscarbonate, butanetriol cyclic carbonate and heptanetriol cyclic carbonate.

So that those skilled in the art may more easily understand the synthesis of the compounds of this invention, the following non-limiting examples are presented. All percentages in the examples are by weight unless otherwise indicated.

EXAMPLE 1

Thirty grams of glycerol carbonate is placed in a 250 ml three neck flask, fitted with a thermometer, magnetic stirrer, gas-inlet tube and a dry ice condenser. Over a nineteen hour period 37 grams of hexafluoroacetone are added to the flask while the flask temperature is maintained at 26°C. to 35°C. Analysis of the hemiketal product shows 34.75% fluorine, 27.4% carbon and 3.25% hydrogen.

44.3 grams of the above product is then further heated at 125°C. for 26 hours during which time 8.2 grams of $CO_2$ is given off. The product is then dissolved in 120 ml of chloroform and washed with three 60 ml portions of dilute $NaHCO_3$ and one 60 ml portion of water. The chloroform is then flashed off at 50°–60°C. under vacuum, yielding 18.9 grams of 2,2-bis(trifluoromethyl)-4-hydroxymethyl-1,3-dioxolane. This product has a refractive index of 1.35096 at 20°C. and upon analysis contains 46.3% fluorine, 29.8% carbon and 2.94% hydrogen. The product shows excellent hydrolytic stability in the presence of concentrated hydrochloric acid.

EXAMPLE 2

In accordance with the procedure of Example 1, 41.8 grams of ethylene glycol is reacted with 54 grams of hexafluoro acetone at 26°–35°C. for four hours and yields 95.8 grams of product.

8.5 grams of this hydroxyethyl hemiketal of hexafluoroacetone is then reacted with 3 grams of glycerol carbonate at 115°–141°C. for 103 hours. The yield was 66% 2,2-bis(trifluoromethyl)-4-hydroxymethyl-1,3-dioxolane.

EXAMPLE 3

14.8 grams of absolute ethanol is reacted according to the procedure of Example 1, at 26-35°C. with 57.5 grams of hexafluoroacetone for six hours. This product is then degassed at 30°C. and 100-150 mercury (absolute) for an additional 1.5 hours. This product is the ethyl hemiketal of hexafluoroacetone.

5.3 grams of the hemiketal product is mixed with 2.95 grams of glycerol carbonate and heated at 110°C. – 118°C. for 21 hours or until a gas-liquid chromatographic analysis shows a 50% yield of the ketal product. The product is then separated by extraction with 20 ml of chloroform and then is washed 3 times with 5 ml of a 7.0% bicarbonate solution and once with water. 4 grams of the product are obtained by vacuum stripping of the chloroform at 50°C.

The product, 2,2-bis(trifluoromethyl)-4-hydroxymethyl-1,3-dioxolane, is then distilled at 70°–75°C. and 20 mm (Hg absolute) and has a refractive index of 1.34988 at 20°C.

EXAMPLE 4

1.34 grams of sorbitol dicarbonate is dissolved in 3.5 grams of the hemiketal product of Example 3. This mixture is reacted at 105°C. for 24 hours and the clear liquid phase is decanted from the reaction mixture.

1.04 grams of product is obtained after vacuum stripping. The product is soluble in acetone and chloroform and its analysis shows it to contain 36.3% carbon 3.91% hydrogen, and 20.4% fluorine. The product is a monoketal: monocyclic carbonate of soritol.

EXAMPLE 5

5.2 grams of mannitol tricarbonate and 23 grams of ethylene glycol hemiketal of hexafluoroacetone are reacted for 70 hours at 139°–142°C., under reflux. The reaction mixture is then cooled to 80°–90°C. and 5 ml of water is stirred in. An additional 7 ml of water is added and the mixture extracted 5 times with 25 ml. portions of chloroform to yield a water fraction and a chloroform fraction. Evaporation of the chloroform yields 2.59 grams of product.

The evaporation product is further refined by distillation at 80°–105°C. and 0.5 mm. of Hg absolute yielding 2.0 grams of a colorless syrup. After extraction of a small amount of residual ethylene glycol with water the product, predominantly mannitol monocarbonate monoketal, has the following analysis: 33.52% carbon, 3.19% hydrogen and 38.35% fluorine.

The water fraction from the first separation is vacuum stripped with final conditions of 140°–150°C. at 0.5 mm. Hg, absolute. The residue, 3.21 grams of a viscous syrup, is dissolved in 7 ml of acetone from which 0.56 grams of solid is filtered. The acetone is then evaporated and the product is distilled at 140°–175°C. and 0.3 mm of Hg absolute. The product, 1.16 grams of predominantly mannitol monoketal, has the following analyses: 38.28% of carbon, 5.16% of hydrogen and 25.35% of fluorine.

EXAMPLE 6

86.7 grams of dichlorotetrafluoroacetone is added dropwise to 50.7 grams of glycerol carbonate at 27°–35°C. while cooling is applied. The product is stirred at 35°C. for one hour. 50 ml additional glycerol carbonate is added and the temperature is raised to 115°–123°C. $CO_2$ evolution then starts and the temperature is raised to 150°–170°C. for a total period of 42 hours. The product is isolated according to Example 1 and is found to be a liquid, distilling at 119°–121°/20 mm. The refractive index is 1.41844 at 20°C. Analysis shows: hydroxyl number 190, 26.47% carbon, 2.57% hydrogen, 26.0% chlorine, and 27.5% fluorine. The product is 2,2-bis(chlorodifluoromethyl)-4-hydromethyl-1,3-dioxolane.

EXAMPLE 7

Cyclic carbonate of 1,2,4-butanetriol (50 grams) is mixed with the ethyl hemiketal of Example 3 (70 grams) and heated at 118°–123°C. for a period of about 64 hours until $CO_2$ evolution is more than 50% theoretically complete. The product is isolated according to Example 1. The predominant product is 2,2-bis(trifluoromethyl)-4-hydroxymethyl-1,3dioxolane, and distills at 58°–60°C./0.25 mm. It has a refractive index of 1.36261 at 20°C. Analysis shows: hydroxyl number 209, 33.67% carbon, 3.76% hydrogen, 45.0% fluorine. The isomer, 2,2-bis(trifluoromethyl)-4-(2-hydroxyethyl)-1,3-dioxolane may also be obtained in small amounts depending upon the concentration of 2,4-cyclic carbonate in the starting material.

EXAMPLE 8

Cyclic carbonate of 1,2,4-butanetriol (38.4 grams) is treated with 57.9 grams of dichlorotetrafluoroacetone at 25°–40°C. The product is then reacted under reflux at 129°C. for 114 hours after 8 grams butanetriol has been added to provide a higher reaction temperature. The product is isolated according to Example 1. 2,2-bis(chlorodifluoromethyl)-4-hydroxymethyl-1,3-dioxolane was found to distill at 73°–81°C./0.15 mm and has a refractive index of 1.42180 at 20°C. Analysis shows: 29.3% carbon, 2.95% hydrogen, 25.0% fluorine, and 23.0% chlorine.

EXAMPLE 9

Glycerol carbonate (35.4 grams) is treated with 76 grams trichlorotrifluoroacetone dropwise at 26°–40°C. The hemiketal intermediate is diluted with additional glycerol carbonate (total carbonate present was 115.4 grams) and heated under reflux while the temperature gradually rises. Reaction time is 40 hours at 110°–123°C. and 48 hours at 123°–143°C. Weight loss is about 20 grams during that time. The isolated product is 2-chlorodifluoromethyl-2-fluorodichloromethyl-4-hyroxymethyl-1,3-dioxolane, found to distill at 92°C./0.20 mm and have a refractive index of 1.44885 at 20°C.

EXAMPLE 10

0.66 grams of solid hexafluoroacetone monohydrate, obtained by bubbling hexafluoroacetone through distilled water, is added to 1.05 grams of glycerol cyclic carbonate and is then reacted at 100°–111°C. for 64 hour. The reaction product is 2,2-bis(trifluoromethyl)-4-hydroxymethyl-1,3-dioxolane.

EXAMPLE 11

11.8 grams of glycerol carbonate is mixed with 36.2 grams of bis(trichlorodifluoroethyl) ketone and heated at 55°C. for 30 hours.

The reaction mixture temperature is then increased to 125°C. and reacted for an additional 25 hours. The product is predominantly 2,2-bis(trichlorodifluoroethyl)-b 4-hydroxymethyl-1,3-dioxolane.

EXAMPLE 12

18.6 grams of 1,2,3,4-tetrahydroxyhexane-1,2-carbonate and 36.4 grams of pentafluoroethyl-heptafluoropropyl ketone are heated at 70°C. for 20 hours.

The reaction temperature is then increased to 130°C. for an additional 30 hours. The product is 2-pentafluoroethyl-2,heptafluoropropyl-4-hydroxyethyl-5-(1-hydroxypropyl)-1,3-dioxolane. Side products formed are 2-pentafluoroethyl-2-heptafluoropropyl-4-hydroxymethyl-5-hydroxy-6-ethyl-1,3-dioxane and 2-pentafluoroethyl-2-heptafluoropropyl-5-hydroxy-6-(1-hydroxypropyl)-1,3-dioxane.

The cyclic ketals of this invention have many utilities; they can be used as fire-retardant additives in polyurethane resins and polyester resins, they can with minor modifications be used as soil repellants in the textile industry or they can be utilized by the manufacturing arts in water repellant compositions, and have been found to have surface active properties useful in anti-foaming applications.

In particular the cyclic ketals of this invention when added in concentrations as low as about .01 weight percent to water significantly reduce surface tension. The cyclic ketal 2,2-bis(trifluoromethyl)-4-hydroxymethyl 1,3-dioxolane, when added in concentrations of .113, .065 and .013 weight percent in water produced surface tensions of 53.9, 64.9 and 68.4 dynes/cm. respectively. A trace amount of the above cyclic ketal when added to a foamed detergent solution containing 0.5 weight percent of nonionic or ionic agent in water, effectively breaks the foam restoring a clear liquid surface.

Having thus described my invention, I claim:

1. A process for preparing a cyclic ketal which comprises heating a mixture of a ketone having from three to nine carbon atoms and characterized by the formula

wherein each R is a halogenated alkyl radical having at least two halogen atoms and having not more than 3 non-halogenated carbon atoms, the carbon atom of said halogenated alkyl radical which is attached to the carbonyl atom of the ketone has at least two halogen atoms, and said halogen has an atomic weight of not more than 36, with a cyclic carbonate of a polyhydric alcohol having from 3 to 6 carbon atoms and from 3 to 6 hydroxyl groups, with the proviso that the reaction is carried out in the presence of water or a lower alcohol when the cyclic carbonate does not have a hydroxyl group.

2. A process of claim 1 wherein said cyclic carbonate has at least one hydroxyl group.

3. A process according to claim 1 wherein the ketone is present in a ratio of up to about 10 mols of ketone per cyclic carbonate group and the reaction mixture is heated at a temperature of at least 100°C. for at least about one hour to insure formation of the cyclic ketal.

4. A process of claim 1 wherein the mols of ketone per cyclic carbonate group of said cyclic carbonate is from 0.3 to about 3 and the temperature is maintained at about 25°C. to about 60°C. for 0.5 to 30 hours and thereafter at about 120°C. to 160°C. until the evolution of carbon dioxide has ceased.

5. A process of claim 1 wherein each R is a perhalogenated alkyl radical of the formula $C_nX_{2n+1}$ wherein $n$ is a number from 1 to 7.

6. A process according to claim 1 wherein the ketone is selected from the group consisting of hexafluoroacetone, chloropentafluoroacetones, dichlorotetrafluoroacetones, and trichlorotrifluoroacetones and the cyclic carbonate is a carbonate of a polyhydric alcohol selected from the group consisting of sorbitol, threitol, erythritol, glycerine, butanetriols, and xylitol.

* * * * *